United States Patent [19]

Sagara

[11] Patent Number: 4,756,621

[45] Date of Patent: Jul. 12, 1988

[54] APPARATUS FOR MEASURING A LENGTH OF DISPLACEMENT

[75] Inventor: Makoto Sagara, Numazu, Japan

[73] Assignee: Toshiba Kikai Kabushiki Kaisha, Tokyo, Japan

[21] Appl. No.: 909,889

[22] Filed: Sep. 22, 1986

[30] Foreign Application Priority Data

Oct. 16, 1985 [JP] Japan ................. 60-230862
Oct. 16, 1985 [JP] Japan ................. 60-230863

[51] Int. Cl.$^4$ ............... G01B 11/02; G01B 11/14; G06K 9/20
[52] U.S. Cl. ............... 356/383; 356/373; 356/375; 356/385; 382/15; 382/48
[58] Field of Search ......... 382/15, 48; 356/373, 356/375, 383, 385, 28

[56] References Cited

U.S. PATENT DOCUMENTS

| | | | |
|---|---|---|---|
| 3,897,156 | 7/1975 | Chasson | 356/383 |
| 4,199,254 | 4/1980 | Kobayashi et al. | 356/28 |
| 4,309,104 | 1/1982 | Prinz et al. | 356/28 |
| 4,312,592 | 1/1982 | Sabater et al. | 356/373 |
| 4,637,058 | 1/1987 | Ross et al. | 382/48 |
| 4,644,584 | 2/1987 | Nagashima et al. | 382/48 |

FOREIGN PATENT DOCUMENTS

0157148 10/1985 European Pat. Off. ......... 356/383

*Primary Examiner*—Stephen C. Buczinski
*Attorney, Agent, or Firm*—Cushman, Darby & Cushman

[57] ABSTRACT

Apparatus for measuring a displacement of a movable member or a diameter of a cylindrical member comprises a photoelectric converting element array to convert light reflected by the surface of the member for producing an electric signal utilized to form a pattern information of the surface. The characterizing points of the pattern information are extracted and binarized into a binary pattern information which is compared with a reference pattern information. The difference between them is accumulated to determine the displacement. To measure a diameter the displacement thus obtained is divided by circular constant n.

8 Claims, 5 Drawing Sheets

APPARATUS FOR MEASURING A LENGTH OF DISPLACEMENT

BACKGROUND OF THE INVENTION

This invention relates to a length off displacement measuring apparatus and, more particularly, to an apparatus for measuring a length of displacement between two relatively movable members and an outer or inner diameter of a cylindrical member.

When automating machine tools and various industrial machines, it is necessary to accurately detect the amount of relative displacement or distance between two relatively movable members, for example, a bed and a table of the machine tool.

Among prior art apparatus for measuring the amount of relative movement, that is the displacement between two relatively movable members, are included apparatus such as an Inductsyn wherein a scale and a slider are mounted on the opposing surfaces of two movable members, an exciting current is passed through the scale, and an electric signal induced in the slider is used to detect the amount of relative movement of the two members, and apparatus wherein the rotational angle of a motor for moving one member relative to the other is detected by a Resolver so as to detect the amount of relative movement of the two members.

According to the former apparatus, it is necessary to accurately mount a machined scale and a slider on the opposing surfaces of the relatively movable members. Furthermore, for the purpose of increasing the accuracy of measurement, it is necessary to precisely finish the scale with its pitch as small as possible. This not only requires a large amount of labor and time but also increases the cost of manufacturing. On the other hand the latter apparatus requires a complicated electrical processing circuit, and even when the rotational angle of the motor is measured accurately, measurement errors are caused due to errors of the clearances of the speed reduction mechanism and the feed mechanism driven by the motor.

In the past, the diameter, for example the outer diameter, of a large workpiece machined by a vertical lathe was measured by a large micrometer specially manufactured for this purpose or by placing blocks on the diametrically opposite positions of the workpiece and then measuring the distance between the blocks with an inside micrometer.

However, such large micrometer is heavy and difficult to handle, thus causing poor accuracy of measurement, and where the inside micrometer is used it is difficult not only to accurately position the blocks in contact with the workpiece but also to accurately connect the micrometer.

Besides these apparatus there is another diameter measuring apparatus wherein a table supporting a workpiece is rotated, and a roller of a known diameter is urged against the peripheral surface of the workpiece so as to calculate the diameter of the workpiece by using the number of revolutions of the roller. However, due to slip of the roller, the accuracy of measurement is degraded. Moreover, when the roller is pressed against the surface of the workpiece, the surface would be damaged when it is made of relatively soft material.

When using an inside micrometer for measuring an inner diameter, as the inner diameter increases the same problem occurs.

SUMMARY OF THE INVENTION

Accordingly, it is an object of this invention to provide an improved apparatus capable of accurately measuring a length of displacement between two spaced points, more particularly, relative movement or displacement of two relatively movable members and an inner or outer diameter of a cylindrical body.

Another object of this invention is to provide a novel displacement measuring an apparatus for accurately measuring amount of relative movement of relatively movable members such as a bed and a table supporting a workpiece without using a precisely machined scale.

Still another object of this invention is to provide a novel apparatus for measuring inner or outer diameter of a large hollow cylindrical member without using a large inside micrometer.

According to this invention ther is provided apparatus for measuring a length of displacement between two spaced points comprising: a source of light for projecting light on a surface including one of the points; a photoelectric converting element array disposed on a surface including the other of the points for detecting light reflected by the surface including the one point to produce a pattern information of the surface including the one point; means for relatively moving the two surfaces; means for extracting characterizing points of the pattern information; binarizing means for processing the characterizing points to obtain a binary pattern information; first pattern memory means for storing the binary pattern information; second pattern memory means for storing, as a reference pattern, a pattern information detected by the photoelectric converting element array prior to the pattern information stored in the first pattern memory means; and arithmetic processing means including means for calculating a deviation of the pattern information stored in the first pattern memory means from the reference pattern stored in the second pattern memory means, deviation memory means accumulating and storing the deviation, and means for updating the reference pattern stored in the second pattern memory means with the pattern information stored in the first pattern memory means.

According to one embodiment, the apparatus of this invention is used to measure relative movement between a bed of a machine tool and a table supporting a workpiece.

According to another embodiment, the apparatus of this invention is used to measure an outer diameter of a cylindrical body or an outer or inner diameter of a hollow cylindrical member.

DESCRIPTION OF THE PREFERRED EMBODIMENTS

Figure 1:
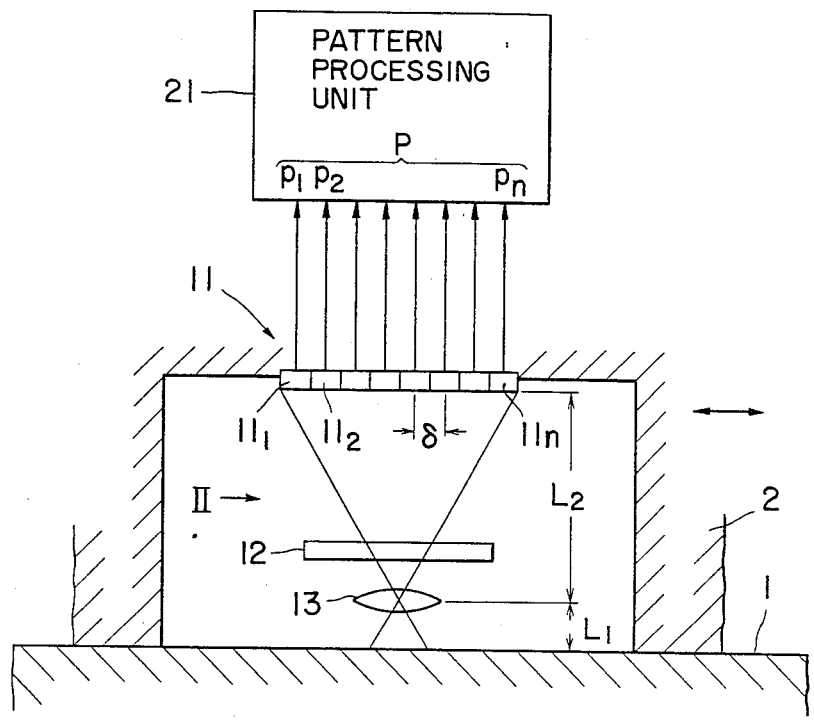
FIG. 1 is a schematic representation of one embodiment of the distance measuring apparatus of this invention applied to measure the amount of displacement of relatively movable members.

FIG. 1 shows the displacement measuring apparatus of this invention as applied to a machine tool including a bed 1 and a table 2 reciprocating on the bed 1 as shown by a double headed arrow. The upper or sliding surface of the bed is treated such that the brightness of the light reflected by the surface would not be uniform in the direction of sliding. For example, marks in the form of bright and dark patterns or colors are formed on the surface.

Figure 2:
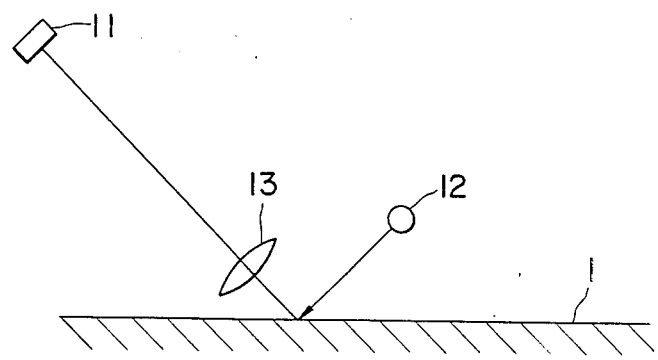
FIG. 2 is a side view of the optical system as seen in the direction of an arrow II shown in FIG. 1.
Figure 3:
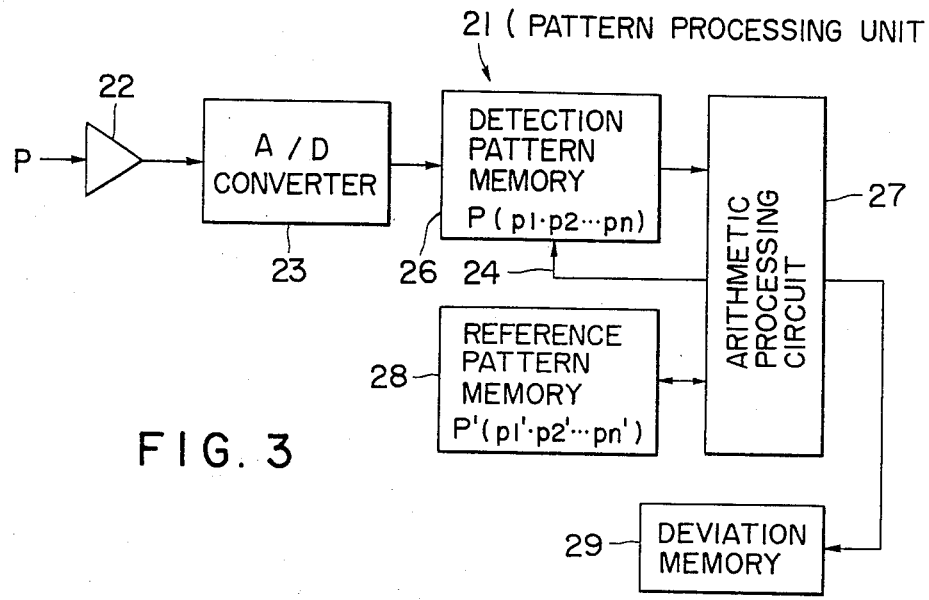
FIG. 3 is a block diagram showing a pattern processing unit.

As shown in FIGS. 1 and 2, an array 11 of photoelectric converting elements $11_1 \sim 11_n$ is disposed on the table 2 at a predetermined spacing from the bed 1, the elements being juxtaposed in the direction of the relative movement between the bed and table.

There are provided an elongated light source 12 extending in the direction of relative movement and a condenser lens 13 for projecting the light reflected by the surface of the bed 1 upon the photoelectric converting elements $11_1 \sim 11_n$ each comprising a charge coupled device, phototransistor or the like. As a consequence, the brightness pattern on the surface of the bed 1 is electrically detected by n elements of $11_1 \sim 11_n$ of the photoelectric converting element array 11 and then sent to a pattern processing unit 21 shown in FIG. 1. Denoting the spacing between adjacent photoelectric converting elements by $\delta$, the distance between the surface of bed 1 and lens 13 by $L_1$ and the distance between the lens and the photoelectric converting elements $11_1 \sim 11_n$ by $L_2$, a resolution of $(L_1/L_2)\delta$ can be obtained.

A pattern information P sent to the pattern processing unit 21 shown in FIG. 1 is amplified by an amplifier 22 and then supplied to an A/D converter 23 including a binarizing means, not shown. The A/D converter 22 converts the inputted analog signal into a digital signal and extracts the characterizing points so as to convert them into binary pattern informations of "1" and "0" which are supplied to a detection pattern memory device 26 acting as a first pattern memory device.

The expression "extraction of the characteristic points" does not mean conversion of analog signals produced by n photoelectric converting elements into a digital quantity consisting of a certain number of bits but means a specific binarizing processing wherein only characteristic points of a pattern between n photoelectric converting elements are converted into "1" whereas other points are converted into "0". Examples of the characteristic points are as follows. Thus when binarizing the maximum and minimum values of the brightness information of the pattern depending upon whether these values are larger or smaller than a given threshold value, transition points from bright to dark, and dark to bright and the center points of continuous photoelectric converting elements which become bright at the time of binarizing and the center points of continuous elements which become dark are examples of the characteristic points. As an example, suppose now that a pattern obtained by 16 photoelectric converting elements is represented by a brightness information of 0~15 (16 steps) and that the brightness information is shown by:

P=(4, 6, 8, 9, 7, 4, 3, 2, 3, 5, 9, 12, 13, 10, 8 and 7), and by extracting and binarizing the characteristic points in terms of the maximum and minimum points, we obtain:

P=(0 0 0 1; 0 0 0 1; 0 0 0 0; 1 0 0 0; ...)

Figure 5:
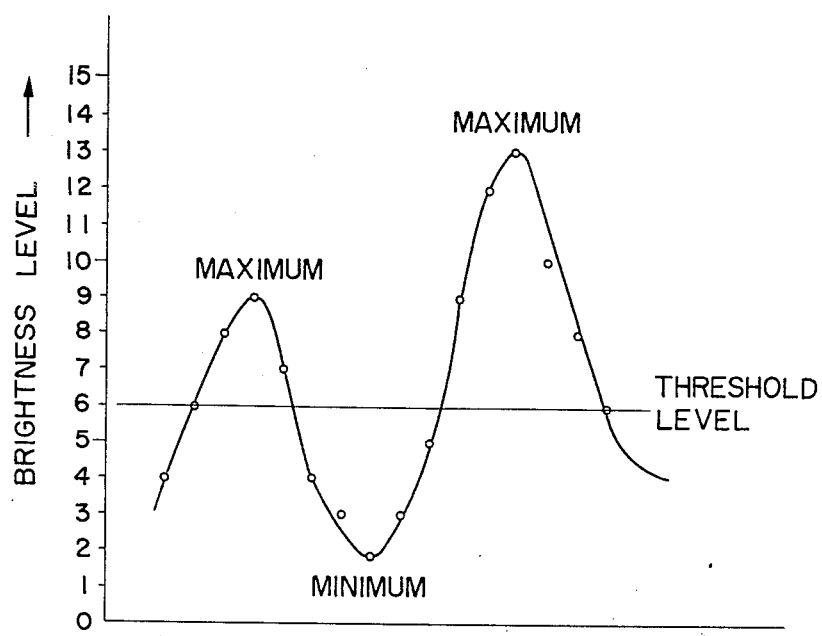
FIGS. 5 and 6 are graphs showing different methods of determining the amount of displacement.

This can be more fully understood by the following description. FIG. 5 is a graph showing a variation of the brightness level of the surface. By binarizing the brightness level with reference to a threshold level of 6 we obtain:

0 0 0 1, 0 0 0 1, 0 0 0 0, 1 0 0 0.

The amount of deviation from a reference pattern is calculated taking these maximum and minimum values as references so as to obtain the distance by accumulating the calculated values.

Figure 6:
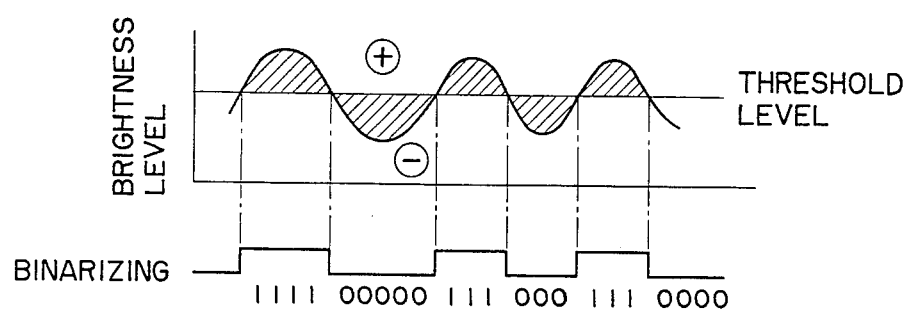

FIG. 6 is curves showing another method of determining the quantity of deviation. Thus, the brightness information obtained by the photoelectric converting elements is partitioned into positive and negative half cycles taking the threshold level as a reference, thus obtaining:

1 1 1 1, 0 0 0 0 0, 1 1 1, 0 0 0, 1 1 1, 0 0 0 0, ...

These binary values are compared with the next input information taking build down and build up points where "1" changes to "0" and "0" changes to "1" as reference to determine the amounts of deviations which are accumulated to determine the distance.

The binary pattern information obtained by extracting characteristic points and stored in the detection pattern memory device 26 is read out and supplied to an arithmetic processing circuit 27 each time a read instruction 24 is applied to the memory device 26 from the arithmetic processing circuit 27 which compares the output of the first pattern memory circuit 26 with the output of a second or reference pattern memory device 28 for calculating the deviation of the binarized pattern information from the reference pattern. Each time the calculation of the deviation is made, the content of the reference pattern memory device 28 is sequentially updated to the pattern information in the detection pattern memory device 26. Upon completion of a series of processings, a read instruction 24 for the next arithmetic operation is applied to the detection pattern memory device 26 from the processing circuit 27 for supplying the pattern information to the processing circuit 27.

Figure 4:
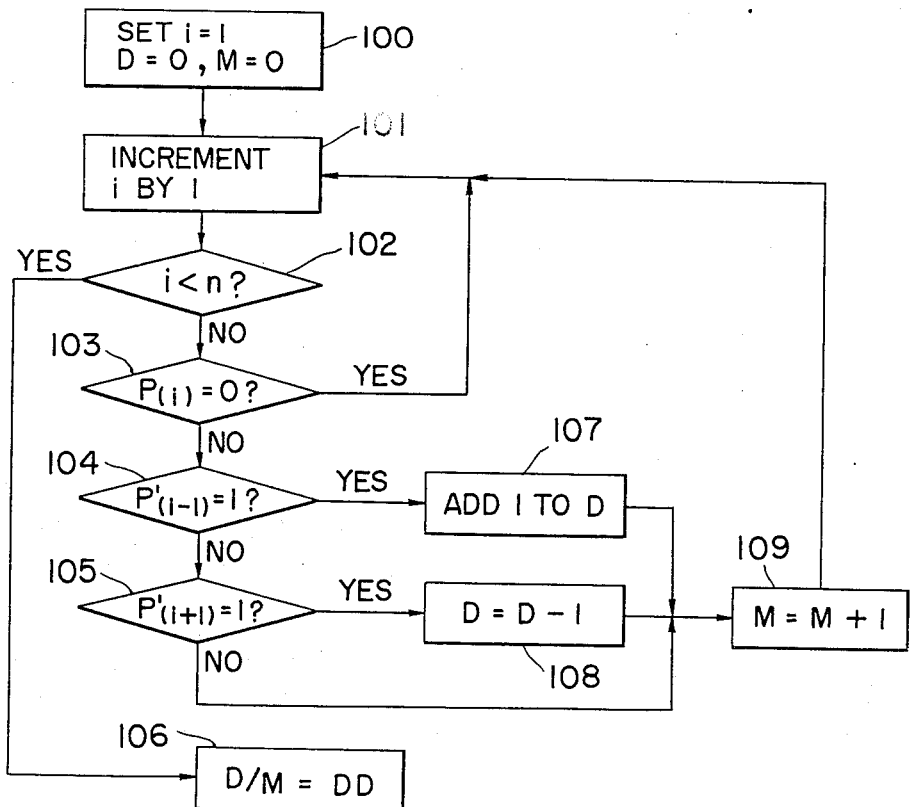
FIG. 4 is a flow chart showing calculating procedures of the amount of displacement.

Denoting the vector of a pattern information stored in the detection pattern memory device 26, that is, of the pattern information just stored in the memory device as a result of a present sampling by $P(p_1, p_2, \ldots p_n)$, and denoting the vector of a reference pattern stored in the reference pattern memory device 28, that is, the reference pattern renewed by the previous sampling by $P'(p_1', p_2', \ldots p_n')$, the arithmetic processing circuit 27 calculates the deviation according to a flow chart shown in FIG. 4.

More particularly, at step 100, initial conditions of i=1, D=0 and M=0 are set wherein i represents an element number, D the amount of deviation of each characteristic point expressed in terms of an interelement spacing and M the number of characteristic points. At step 101 i is incremented by one. At step 102 a judgement is made as to whether i is smaller than the total number n of the photoelectric converting elements. At step 103, a judgement is made as to whether a value P(i) detected at the ith element and converted into a binary value is equal to "0" or not. When the result of this judgement is YES, the program is returned to step 101. On the other hand, when the result of judgement is not "0", that is "1", at step 104, a judgement is made as to whether P'(i−1) which has been stored in the reference pattern memory device 28 is "1" or not. Where P'(i−1)="1", it is judged that the characterizing point has been displaced by one element in a (+) direction and at step 107, 1 is added to the amount of displacement D. When the result of judgement executed at step 104 shows that P'(i−1) is not equal to "1", that is "0", then at step 105 a judgement is made as to whether P'(i+1) is equal to "1" or not. When the result of this judgement is "1", it is judged that the characterizing point has been displaced by one element in a (−) direction and at step 108, "1" is subtracted from D. When P'(i+1) is not equal to "1", that is equal to "0", or when 1 is added to D at step 107, at step 109, 1 is added to the number M of the characterizing points. After that, the program is returned to step 101.

When i becomes equal to n by repeating these steps, at step 106, the sum D of the amount of displacement is divided by the number M of the characterizing points for calculating an average amount of the displacement DD.

Upon completion of the calculation of the amount of displacement of the detecting pattern P with reference to the reference pattern P', the average amount of the displacement DD is stored in the displacement memory device 29 and the content of the reference pattern P' is updated or changed to the detecting pattern P and the next read instruction 24 is applied to the detection pattern memory device 26.

Consequently, in a state wherein table 2 is stationary with respect to bed 1, since the positions of the characterizing points of the detecting pattern P and the reference pattern P' coincide with each other, the content of the displacement memory device 29 would not be updated. However, as the table 2 is moved relative to bed 1, since the characterizing points of the detection pattern P and the reference pattern P' are displaced in accordance with the amount of the relative movement, the content of the displacement memory device 29 varies in accordance with the direction of movement.

As above described, as the table 2 is moved relative to the bed 1, the total amount of the relative displacement would be stored in the displacement memory device and the stored value is converted into a value in terms of the measuring units, the converted value being displayed on a display device, not shown, or inputted into a numerically controlled device or the like to be utilized as control data.

As above described, according to this embodiment an optical pattern information regarding the bed surface condition is converted into an electric signal with the photoelectric converting element array 11 and the binarized pattern information with reference to the characterizing point is compared with a reference pattern which has been updated at the time of the previous sampling, thereby to obtain the amount of displacement of the detected pattern information with reference to the reference pattern. Accordingly, it is not necessary to attach a precisely machined scale on the surface of an article as in the prior art Inductsyn. Moreover, different from a Resolver, as the processing circuit is not complicated, the overall construction can be simplified.

Especially, since the distance measuring apparatus of this invention is constructed such that it detects an optical pattern information of the surface of an article, the measured surface may be in such state that the brightness of the reflected light would not be uniform in the direction of the relative movement of the surfaces. For example, regular or irregular marks may be coated on the surface. In a simplest case, the coarseness pattern of an as machined surface can be used. Consequently, it is not necessary to finely machine relatively moving members. Moreover, as the measuring apparatus of this invention does not contact the article to be measured there is no fear of damaging the surface, thus enabling high accuracy measurement for an article made of relatively soft material.

Furthermore, as analog signals detected by respective elements of the photoelectric converting element array 11 are converted into a binarized pattern information by extracting characterizing points, post processing is simple, and the calculation of the amount of deviation between the reference pattern P' and the detected pattern P can be made at a high speed.

Since there is provided a lens 13 that focuses, with a predetermined magnifying power, the light reflected from the surface of bed 1 on the photoelectric converting element array 11, a high resolution expressed by $(L_1/L_2)\delta$ can be obtained.

Although in the foregoing embodiment, the characterizing points were extracted by the A/D converter 23, such extraction can be made by the arithmetic processing circuit 27. Furthermore, depending upon the construction of the A/D converter, the read instruction 24 may be applied to amplifier 22 or A/D converter 23. Although in the foregoing description, for simplifying the description the amount of displacement between the characterizing points of the reference pattern P' and the detected pattern P was assumed to be a maximum of the width of one element, a displacement larger than one element can be detected by comparing P'(i−2) with P'(i+2) and so forth in the flow chart shown in FIG. 4.

Although in the flow chart shown in FIG. 4, the average amount of displacement DD was calculated by dividing the amount of displacement with the total number M of characterizing points, if M is replaced by a constant the division operation D/M can be omitted, thereby shortening the calculation time.

Although foregoing embodiment was described for detecting the amount of relative movement of two rectilinearly moving bodies, where the photoelectric converting element array 11 is disposed about a peripheral surface of a rotary member, the distance of movement, the amount of peripheral movement or the radial displacement of the rotary body can be measured. It is rather difficult to arcuately dispose the elements along an outer or inner peripheral surface. Further, it is necessary to change the arrangement of the measuring elements for different diameters to be measured which is inconvenient. Even when elements disposed along a straight line are used so long as the central one of the elements is located close to the measuring surface, error becomes minimum. It is also possible to obtain the diameter of a cylindrial rotary member by measuring the distance of the peripheral movement in which the rotary member rotates once, that is, the peripheral length of the rotary member, and then dividing it with $\pi$.

Where N photoelectric converting element arrays 11 are prepared and when these arrays are disposed in parallel with the arrays displaced by 1/N of the spacing between adjacent elements in the direction of the relative movement, the resolution can be improved N times.

With regard to the reference pattern to be compared with a detected pattern information, instead of using a single reference pattern updated and stored at the time of previous sampling, a plurality of reference patterns which have been previously updated may be stored and by comparing each of the reference patterns with a detected pattern information, analysis of the pattern can be made more accurately.

Where a plurality of photoelectric converting elements are arranged in a matrix, two dimensional relative movements can also be measured.

Although, in the foregoing embodiments, the invention was applied to detect the amount of relative movement between bed 1 and table 2 of a machine tool, it should be understood that the displacement measuring apparatus of this invention can be applied to any case where two members are moved relatively when the distance therebetween is maintained at a substantially constant value.

Figure 7:
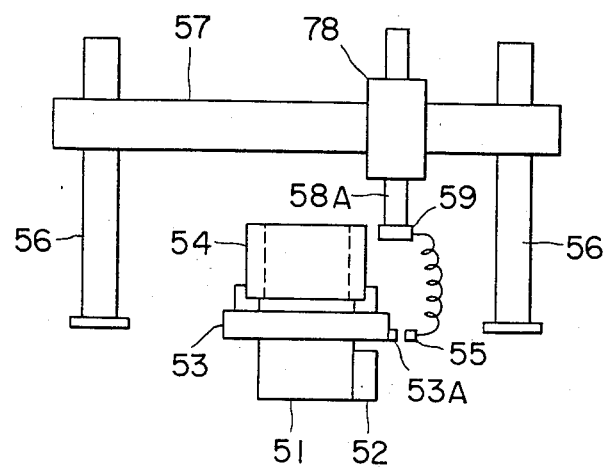
FIG. 7 is a schematic side view of a vertical type lathe incorporated with diameter measuring apparatus embodying the invention.
Figure 8:
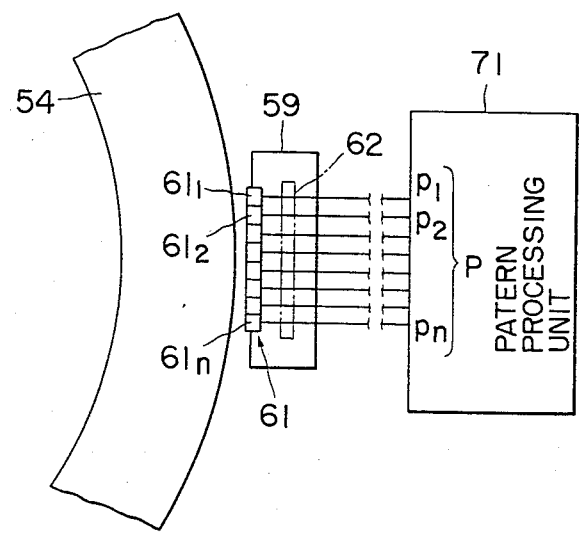
FIG. 8 is a partial plan view showing the relation among a workpiece, a photoelectric converting element array, a light source and a pattern processing unit.
Figure 9:
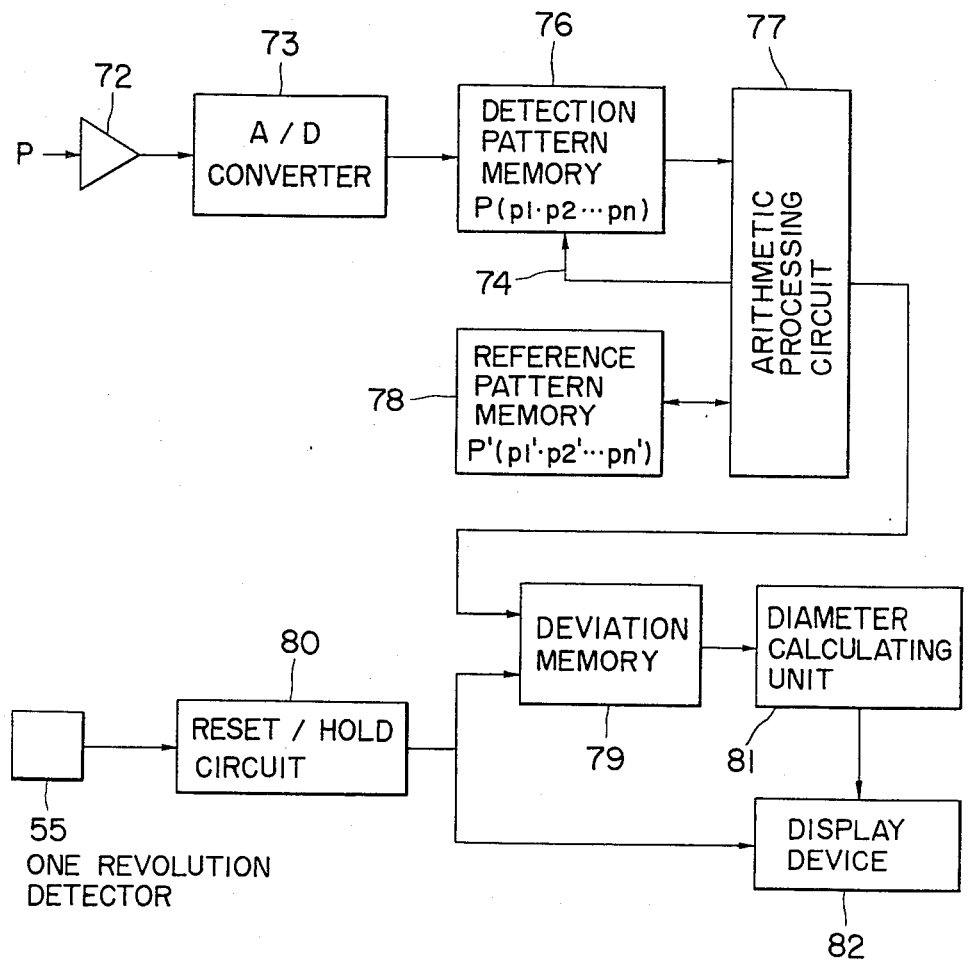
FIG. 9 is a block diagram showing an electric connection of various elements constituting diameter measuring apparatus according to this invention.

FIGS. 7, 8 and 9 show another embodiment of this invention wherein the distance measuring apparatus of this invention is used to measure the inner or outer diameter of a cylindrical member.

FIG. 7 shows a side view of a large size vertical lathe incorporated with the diameter measuring apparatus embodying the invention. As shown, a table 53 rotated by a driving mechanism 52 is mounted on a bed 51. Table 53 supports a hollow cylindrical workpiece 54 and an one revolution detector 55 is disposed to confront the peripheral surface of the workpiece. The one revolution detector 55 is secured to the bed through a bracket, not shown, and comprises a switch, not shown, which is operated by a projection or a mark 53A formed at one point of the peripheral surface of the table 53.

Vertical columns 56 are provided on both sides of bed 51 for supporting a cross rail 57 to be movable in the vertical direction. A tool post 58 is mounted on the cross rail 57 to be slidable in the horizontal direction. A detection head 59 is secured to the lower end of a ram 58A supported by the tool post 58 to face the outer periphery of the workpiece 54. The peripheral surface thereof is treated such that the brightness of light reflected by the peripheral surface would not be uniform in the pheripheral direction as the workpiece 54 and the detection head are rotated where a light source of uniform brightness is used. For example, dark and bright marks which nonuniformly reflect light in the circumferential direction are applied to the peripheral surface.

As shown in FIG. 8, detection head 59 comprises a photoelectric converting element array 61 arranged along the outer periphery of the workpiece 54 with a predetermined spacing therebetween, and a straight tube type light source 62. The photoelectric converting element array 61 is constituted by n photoelectric converting elements $61_1 \sim 61_n$ equally spaced in the circumferential direction. Consequently, the brightness pattern of the peripheral surface is detected by the n photoelectric converting elements $61_1 \sim 61_n$ and then sent to a pattern processing unit 71. As has been described in connection with FIG. 1 when a lens is provided between the workpiece 54 and the photoelectric converting element array 61, a resolution of $(L_1/L_2)\delta$ can be obtained.

As shown in FIG. 9, a pattern information P sent to the pattern processing unit 71 is amplified by an amplifier 72 and then sent to an A/D converter 73 including a binarizing means, which converts an input analog signal into a digital signal at the same time when the binarizing means extracts characteristic points and forms a binary pattern information of "1" and "0" which is stored in a first pattern memory device 76 acting as a detection pattern memory device. Extraction of the characterizing points has already been described with reference to FIGS. 5 and 6.

The binary pattern information thus stored in the detection pattern memory device 76 is read out into an arithmetic processing circuit 77 each time it is supplied with a read instruction 74. The arithmetic processing circuit 77 compares the read out pattern information with a reference pattern stored in a second or reference pattern memory device 78 for calculating the difference therebetween. The reference pattern stored in the reference pattern memory device 78 is sequentially updated to the pattern information in the detection pattern memory device 76 each time the calculation of the difference or deviation is completed. Upon completion of a series of processings, the read instruction 74 for the next calculation is applied to the detection memory device 76 from the arithmetic processing circuit 77 in the same manner as in the first embodiment.

The calculation of the deviation is executed in the same manner as has been described in connection with the flow chart shown in FIG. 4.

As a consequence, while the workpiece 54 is standstill, since the positions of the detection pattern P and the reference pattern P' coincide with each other, the content of the deviation memory device 79 would not be updated. As the workpiece 54 is rotated, the characterizing point position of the workpiece 54 deviates from that of the reference pattern P' in accordance with the amount of rotation of the workpiece so that the content of the deviation memory device 79 varies according to the direction of rotation of the workpiece. In this manner, as the workpiece is rotated, the distance of rotation of the peripheral surface of the workpiece 54 is accumulated and stored in the deviation memory device 79.

The value stored in the deviation memory device 79 is reset when a reset signal is applied thereto from a reset/hold circuit 80 and held when a hold signal is applied. The output of the deviation memory device 79 is divided with the circular constant $\pi$ in a diameter calculator 81 and the result of division is displayed on a display device 82. The reset/hold circuit 80 produces a reset signal when the one revolution detector 55 is operated at the first time whereas a hold signal when the one revolution detector is operated at the second time.

Consequently, when the table 53 is rotated by the driving mechanism 52 and while the distance of movement of the peripheral surface of the workpiece 54 is being stored in the deviation memory device 79, as the one revolution detector 55 is operated at the first time, the deviation memory device 79 is reset by a reset signal outputted by the reset/hold circuit 80. As the table 53 is rotated further, the distance of movement of the peripheral surface of the workpiece after resetting is accumulated and stored in the deviation memory device 79. Upon completion of one revolution of the table 53, the one revolution detector 55 is turned ON so that the content of the deviation memory device 79 would be held by a hold signal from reset/hold circuit 80. The value thus held is divided with the circuit constant $\pi$ and the outer diameter of the workpiece thus calculated is displayed on a display device 82.

As above described according to the modified embodiment, the optical pattern information of the peripheral surface of a cylindrical workpiece 54 is converted into an electric signal using a photoelectric converting element array 51, a pattern information formed by binarizing characteristic points is compared with a reference pattern updated and stored at the time of previous sampling for obtaining a deviation of detected pattern information from the reference pattern, the deviation is accumulated during one revolution of the workpiece, and the accumulated value is divided by the circulation constant $\pi$ for determining the outer diameter of the workpiece. Accordingly, it is possible to readily make an accurate measuring without using a large and heavy micrometer or an inside micrometer.

Especially, since the optical pattern information of the peripheral surface of the workpiece is detected, it is only necessary to treat the peripheral surface such that the brightness of light reflected thereby would not be uniform in the circumferential direction. For example, regular or irregular marks may be coated on the peripheral surface. Where the peripheral surface is coarse, its coarseness pattern can be used as it is without any treatment. Moreover, as the measuring apparatus does not contact a surface to be measured there is no fear of damaging the surface. When compared with the prior art method of urging a measuring roller against the surface to be measured, measurement accuracy is not affected by the slip of the measuring roller. Thus even when the workpiece is made of relatively soft material highly accurate measurement is possible without damaging the workpiece.

Furthermore, the characterizing points of analog signals detected by respective elements of the photoelectric converting element array are extracted and binarized to obtain a binary pattern information so that post processing becomes simple, and the calculation of the difference between the reference pattern P' and the detection pattern P can be made at a high speed. The same advantages as those described in connection with the first embodiment can also be provided by this modified embodiment.

The reference pattern to be compared with a detected pattern information is not limited to a single reference pattern updated and stored at the time of the previous sampling. Thus, where a plurality of reference patterns previously updated are stored and when all of these reference patterns are compared with a detected pattern information, the analysis of the pattern can be made more accurately. Where the workpiece is rotated a plurality of times, the amount of movement of the peripheral surface per revolution is determined, and then the diameter of the workpiece is determined by dividing the amount of movement with $\pi$, the accuracy of measurement can be improved.

It will be clear that the object of this invention can be attained by rotating the photoelectric converting element array about the workpiece. The inner diameter of the workpiece can also be measured by disposing the photoelectric converting element array along the inner peripheral surface of a hollow cylindrical member. Since it is difficult to arcuately dispose the elements along the inner or outer surface of the hollow cylindrical member and moreover since it is necessary to change the arrangement of the elements as the diameter to be measured changes, a linearly arranged elements may be used so long as the element at the center of the array is located close to the surface to be measured. Instead of measuring the diameter of a workpiece machined by a large vertical lathe, the apparatus of this invention can be used to measure the inner or outer diameter of any cylindrical rotary workpiece.

What is claimed is:

1. Apparatus for measuring a length of displacement between two spaced points comprising:
    a source of light for projecting light on a surface including one of said points;
    a photoelectric converting element array disposed on a surface including the other of said points for detecting light reflected by said surface including said one point to produce a pattern information of said surface including said one point;
    means for relatively moving said two surfaces
    means for extracting characterizing points of said pattern information;
    binarizing means for processing said characterizing points to obtain a binary pattern information;
    first pattern memory means for storing said binary pattern information;
    second pattern memory means for storing, as a reference pattern, a binary pattern information of a pattern information detected by said photoelectric converting element array prior to said pattern information stored in said first pattern memory means; and
    arithmetic processing means including means for calculating a deviation of said pattern information stored in said first pattern memory means from said reference pattern stored in said second pattern memory means, deviation memory means accumulating and storing said deviation, and means for updating said reference pattern stored in said second pattern memory means with said pattern information stored in said memory pattern means.

2. The apparatus according to claim 1 wherein said apparatus is used to measure relative displacement between a bed of a machine tool and a table slidable on said bed, and wherein said photoelectric converting element array is mounted on said table to face an upper surface of said bed.

3. The apparatus according to claim 2 wherein said upper surface is treated to reflect nonuniformly said projected light in the direction of relative movement of said bed and said table.

4. The apparatus according to claim 2 wherein said upper surface is applied with marks of different color or brightness.

5. The apparatus according to claim 1 wherein said apparatus is used to measure an outer or inner diameter of a hollow cylindrical workpiece machined by a tool supported by a vertical ram of a vertical lathe, and wherein said photoelectric converting element array is supported by said vartical ram to face the outer or inner peripheral surface of said workpiece.

6. The apparatus according to claim 5 wherein said outer or inner peripheral surface is treated such that light projected upon said outer or inner peripheral surface would not be uniform in a circumferential direction.

7. The apparatus according to claim 6 wherein dark and bright marks are applied to said outer or inner peripheral surface.

8. The apparatus according to claim 5 further comprising one revolution detector which detects one revolution of said workpiece, a reset/hold circuit connected to said one revolution detector, display means, diameter calculating means connected between said deviation memory means and said display means, and means for applying an output signal of said reset/hold means to said deviation memory means and said display means.

* * * * *